(No Model.)

E. LIPSKA.
HAND TRUCK.

No. 545,239. Patented Aug. 27, 1895.

Attest.
John L. Pratt
Stella M. Grant

Inventor.
Edward Lipska
By M. M. Cady atty.

UNITED STATES PATENT OFFICE.

EDWARD LIPSKA, OF DUBUQUE, IOWA, ASSIGNOR OF ONE-HALF TO GEORGE J. EICHHORN, OF SAME PLACE.

HAND-TRUCK.

SPECIFICATION forming part of Letters Patent No. 545,239, dated August 27, 1895.

Application filed March 29, 1895. Serial No. 543,774. (No model.)

*To all whom it may concern:*

Be it known that I, EDWARD LIPSKA, a citizen of the United States, residing in the city and county of Dubuque and State of Iowa, have invented certain new and useful Improvements in Hand-Trucks; and I do hereby declare the following to be a full, clear, and exact description of the invention, such as will enable others skilled in the art to which it appertains to make and use the same.

My invention relates to that class of trucks, commonly designated "hand-trucks," which are constructed with a vertically-movable platform; and one of the objects is to provide a truck with a lever for raising and lowering the platform and also for propelling the truck, which lever may be attached to or detached from the truck at will.

Another object is to provide means for facilitating the truck, whereby boxes, barrels, and the like may be more easily and conveniently handled; and still another object is to so arrange the truck that it may be used in grocery stores and the like as a platform for barrels, &c., in which is inserted a faucet to draw off the contents of the barrel.

Figure 1:
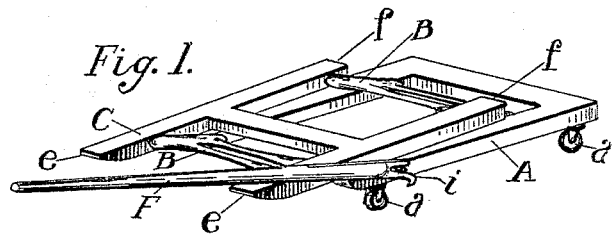
Figure 4:
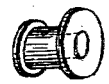
Figure 2:
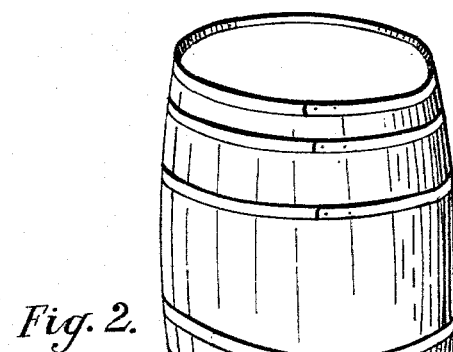
Figure 3:
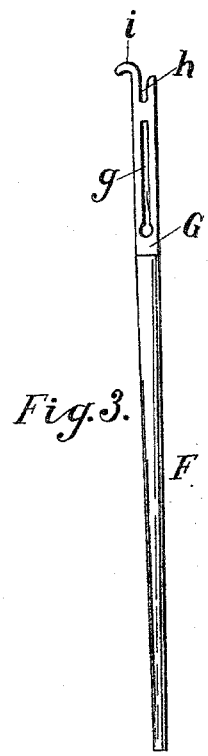

Figure 1 shows the truck with the platform in its lowest position and the lever in position ready for raising. Fig. 2 represents a perspective of the truck with the platform raised to its highest extent, with the lever removed, and also showing how it may be used as a permanent support. Fig. 3 shows the lever removed and the means for attaching it to the truck. Fig. 4 shows the means by which the lever is removably attached to the platform.

Like letters of reference denote corresponding parts in all of the drawings.

A represents the base or frame of the truck, having the caster-wheels $a$ $a$. Pivoted between the sides of the frame are the cranks or arms B B. To the upper part of the cranks B B is pivoted the platform C. At their lower ends they are pivoted to the frame A. It will be here noticed that the cranks B B are pivoted at $b$ $b$ a trifle farther apart than at $d$ $d$ in the base A, which will set the cranks at a different angle. The object of this is, when the platform has been brought to its lowest position, as shown in Fig. 1, the forward ends $e$ $e$ will be lower than the rear ends $f$ $f$ of the platform C. By this mode of construction the front of the platform may be more easily placed under a barrel or box to be raised and, with the lever, the platform with the weight thereon can be started up in raising much more easily and with less force; and, further, when the platform is in its highest position the rear crank will be a little past its center, and in that position it will remain, without locking, from the fact that the lower portion of the rear crank B will rest against the rear of the frame A.

Pivoted to the side of the platform C is a roller D, (shown in perspective in Fig. 4,) and to the side of the frame A is secured a staple or pin E. The lever F is supplied with a plate G, fastened to one of its sides and having a slot $g$ therein and a second slot $h$ at its outer end, and is further provided with a hook $i$ for hooking into a ring I, secured to the forward bar of the frame, whereby the truck may be drawn.

The manner of operating my device is as follows: Starting with the platform C of the truck in its lowest position, the barrel is tipped up slightly, and the rear of the truck is also raised till the points $e$ $e$ can be run under the barrel. The lever F is then placed in position, with the staple E in the slot $h$ and the roller D in the slot $g$, and by lifting on the lever F the load will be raised, and as it is raised the roller D will travel down in the slot $g$ and will materially decrease the friction. When the load is raised to its highest position, the lever is detached and the hook $i$ is caught in the ring I and the truck drawn to any desired place. It will also be seen that by having the lever (which also serves as a tongue) detachable the truck will be useful in grocery stores and other stores as a permanent support for barrels from which liquids are to be drawn by faucets, as the truck will occupy little space when the lever is removed, and the lever may be used for several trucks in the same store. The barrel may also be tapped while lying down and conveniently raised and moved at will.

Having now described my invention, what I claim, and desire to secure by Letters Patent, is—

1. In a hand-truck a lever for raising and lowering the platform thereof, having a handle, a plate secured to the outer end of said handle, with slots in said plate and means secured to the base and the platform of said truck for removably attaching the lever to the truck, substantially as described and shown.

2. A hand truck consisting of the base, cranks pivoted thereto, and a platform applied to the upper ends of the cranks, combined with the removable lever and tongue having a hook on its lower end, and a slot in its side, and the projections on the side of the base and platform with which the lever engages, substantially as set forth.

3. A hand-truck consisting of a base A, resting on wheels $a$, $a$, platform C, cranks B, B, said cranks pivoted in the platform farther apart than they are pivoted in the base, roller D, pivoted to the platform, staple E, secured to the base, and lever F, having plate with slots $g$, and $h$, adapted to engage the roller D, and staple E, all combined to operate substantially as described and shown.

In testimony whereof I affix my signature in presence of two witnesses.

EDWARD LIPSKA.

Witnesses:
MONROE M. CADY,
JOHN L. BUETTELL.